L. H. CRANE & A. A. MINER.
Trileaf-Scale.

No. 165,476.

Patented July 13, 1875.

WITNESSES:
C. Neveux
A. F. Terry

INVENTOR:
L. H. Crane
A. A. Miner
BY
ATTORNEYS.

UNITED STATES PATENT OFFICE.

LUCIUS H. CRANE AND ALBERT A. MINER, OF BRATTLEBOROUGH, VT.

IMPROVEMENT IN TRILEAF SCALES.

Specification forming part of Letters Patent No. 165,476, dated July 13, 1875; application filed June 12, 1875.

*To all whom it may concern:*

Be it known that we, LUCIUS H. CRANE and ALBERT A. MINER, of Brattleborough, Windham county, Vermont, have invented a new and useful Improvement in Trileaf Scales, of which the following is a specification:

Our invention relates to new and useful improvements in measuring-scales of trihedral form, used in drawing and in dividing spaces into equal proportions; and it consists in making the leaves detachable, and so that they, or any one of them, may be drawn out from a common central core to elongate the scale.

Figure 1:
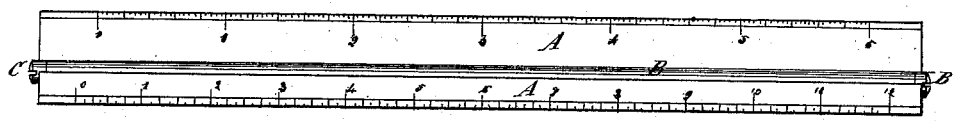
Figure 2:
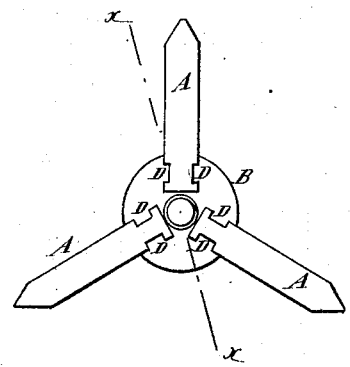
Figure 3:
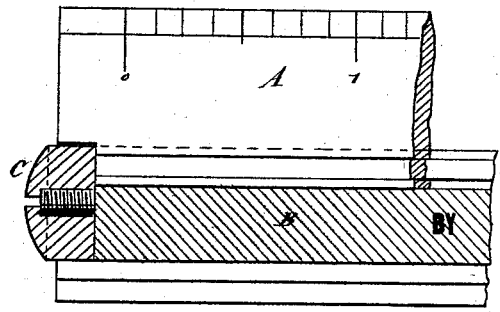

Figure 1 is a view of the scale. Fig. 2 is a cross-section, enlarged; and Fig. 3 is a longitudinal sectional view, (enlarged,) showing the nut at the end of the core, the section being on the line $x$ $x$, Fig. 2.

Similar letters of reference indicate corresponding parts.

A represents the leaves. B is the core. C is the nut on one end of the core. This core is a round rod, having longitudinal grooves to receive the leaves A, upon one or both side of which grooves are projections D. In this example of our invention projections D are shown upon both sides. The leaves are fitted to these grooves, the sides of the leaves near one edge being grooved to receive the projections D. This construction allows the leaves to be withdrawn or the scale extended by drawing out one of the leaves more or less, as may be required. The sides of the leaves are graduated to any desired scale, as seen in Figs. 1 and 3, so that almost any desired space may be obtained. At one end of the core there is a nut, C, (there may be a nut at each end, if desired,) which screws onto the core when the leaves are in place in the grooves of the core, and prevents the leaves from being withdrawn.

Ordinarily these trileaf scales are made with the leaves rigidly fastened together; but by our method the scale is made much more valuable, for nearly all the purposes for which it is designed, than it would be constructed after the old method.

Having thus described our invention, we claim as new and desire to secure by Letters Patent—

A "trileaf scale" having a central core (or rod) with the leaves grooved into it, substantially as shown and described, so that one or more may be withdrawn wholly or in part, as specified, for the purposes set forth.

LUCIUS H. CRANE.
ALBERT A. MINER.

Witnesses:
CHARLIE E. BARRETT,
ELMER REED.